United States Patent
Kusuma et al.

(10) Patent No.: US 6,386,617 B1
(45) Date of Patent: May 14, 2002

(54) CLOSURE PANEL MOUNTING FOR VEHICLE WINDOW OPENINGS

(75) Inventors: David Kusuma, Canton; Prakash Kolluri, Novi; John E. English, Jr., Northville, all of MI (US)

(73) Assignee: Exatec, LLC., Wixom, MI (US)

( * ) Notice: Subject to any disclaimer, the term of this patent is extended or adjusted under 35 U.S.C. 154(b) by 0 days.

(21) Appl. No.: 09/685,511

(22) Filed: Oct. 9, 2000

Related U.S. Application Data

(60) Provisional application No. 60/162,608, filed on Oct. 29, 1999.

(51) Int. Cl.[7] ................................................. B60J 10/02
(52) U.S. Cl. ............................ 296/146.15; 296/146.16; 296/201; 296/147
(58) Field of Search ........................ 296/190.1, 146.15, 296/146.16, 201, 89, 96.21, 148, 107.07, 147

(56) References Cited

U.S. PATENT DOCUMENTS

| | | | | |
|---|---|---|---|---|
| 1,377,164 A | * | 5/1921 | Williams | |
| 1,587,712 A | * | 6/1926 | Foley | |
| 1,609,307 A | * | 12/1926 | Pollard | |
| 2,785,922 A | * | 3/1957 | Chika | |
| 3,026,140 A | * | 3/1962 | Schutte | |
| 4,119,341 A | * | 10/1978 | Cook | |
| 5,096,253 A | * | 3/1992 | Jo et al. | 296/190.1 |
| 5,738,405 A | * | 4/1998 | Richters et al. | 296/196 |
| 5,799,449 A | * | 9/1998 | Lyons et al. | |
| 6,220,650 B1 | * | 4/2001 | Davis et al. | 296/146.16 |

* cited by examiner

Primary Examiner—Joseph D. Pape
(74) Attorney, Agent, or Firm—John R. Benefiel

(57) ABSTRACT

A closure panel mounting for a window opening of a vehicle body structure includes a U-shaped three sided recess into which the panel is slidable, with a fourth side of the closure panel engaged by another closure panel included in the vehicle body structure. In a first embodiment the panel is slid vertically down into tracks extending along the recess, and a top panel has an edge engaging the fourth side of the panel. In a second embodiment, the recess tracks extend horizontally and the panel is slid into the recess from the rear, a vehicle tailgate engaging the end of the panel when swung closed to secure the closure panel in position.

5 Claims, 4 Drawing Sheets

CLOSURE PANEL MOUNTING FOR VEHICLE WINDOW OPENINGS

CROSS REFERENCE TO RELATED APPLICATIONS

This application claims the benefit of provisional application, serial No. 60/162,608, filed on Oct. 29, 1999.

BACKGROUND OF THE INVENTION

This invention concerns window closures for automotive vehicles. Open topped sports vehicles such as some Jeep® models can be equipped with soft tops or removable hard tops which are mounted to the body. Opening windows in soft tops are usually provided by zip out panels in the top. Drop or opening windows have recently been provided for hard tops by providing fill size front doors, with the hard top fit around the front doors. The rear side window closure panels are permanently fixed in the hard top.

It is desirable that rear side window closure panels could be easily removable or replaceable with screens or special decorative window panels, but a sufficiently simple mounting has not heretofore been provided.

It is the object of the present invention to provide a closure panel mounting for such rear side windows of hard tops, which allows a quick and simple removal and replacement of rear window closure panels without the need for hardware fittings.

SUMMARY OF THE INVENTION

The above object and others which will become apparent upon a reading of the following specification and claims are accomplished by a sliding installation in which a closure panel is received in a three sided U-shaped perimeter track defined by the vehicle hard top structure. Soft Velcro® strips can be used to line at least two of the tracks to reduce friction, squeaks, and to seal the clearance spaces against the entry of wind and rain.

In a first embodiment, a fourth side of the closure panel is engaged with a removable hard top panel, the window closure panel slid vertically down into the track to be installed and having an upper edge piece grooved to receive the engaging edge of the top panel.

In a second embodiment, the closure panel is slid forward horizontally into a rear opening defined by the receiving track. In this case, a tailgate when closed engages the rear edge of the closure panel to secure the panel in position.

Thus, the closure panel can be quickly installed, removed, or replaced with panels of a different design without the need to operate closure mechanisms and the like.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Figure 1:
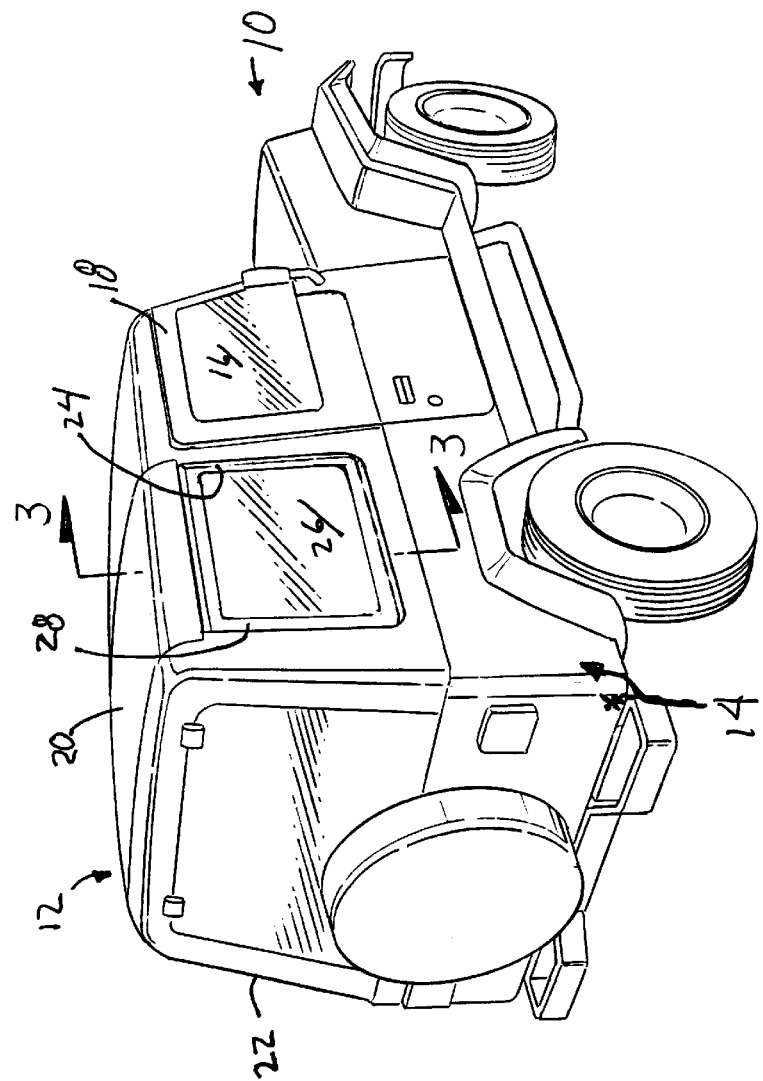
FIG. 1 is a perspective view of an automotive vehicle having a window closure panel mounting according to the present invention.

Referring to the drawings, FIG. 1 shows an automotive vehicle 10 of a type able to be converted from an open topped configuration to a closed top by installing a detachable hard top structure 12 on the open topped vehicle body 14 in the well known manner. U.S. Pat. No. 5,992,917 describes in detail such a hard top combined with a soft top stored on the inside of the hard top, which can be deployed with the hard top removed. Such Jeep® vehicles are currently on sale commercially, and include two spaced apart roll bars (not shown).

As described in U.S. Pat. No. 5,992,917, the hard top 12 is held at the front with latches connected to the top of the windshield header member (not shown) and with removable fasteners at the rear connecting to the top of the open topped body 14.

The vehicle 10 includes front doors 18 around which the hard top 12 is fit, the front doors 18 each mounting a drop window 16 able to be "dropped" by operation of a window mechanism in a conventional manner. The '992 patent describes a detachable window frame. The window frame is also optionally integrally formed with the door 18.

In a first embodiment, such hard top 12 is provided with a removable top panel 20 and a top hinged rear glass panel 22.

The structure of the hard top 12 also may define a U-shaped three sided window opening 24 on each side to the rear of the front doors 18. The rear side window openings 22 are designed to removably receive a window closure panel 26, which may be of glass or molded from lighter weight hard coated polycarbonate, having a black out border 28 applied as an accent and to hide the track details.

Figure 3:
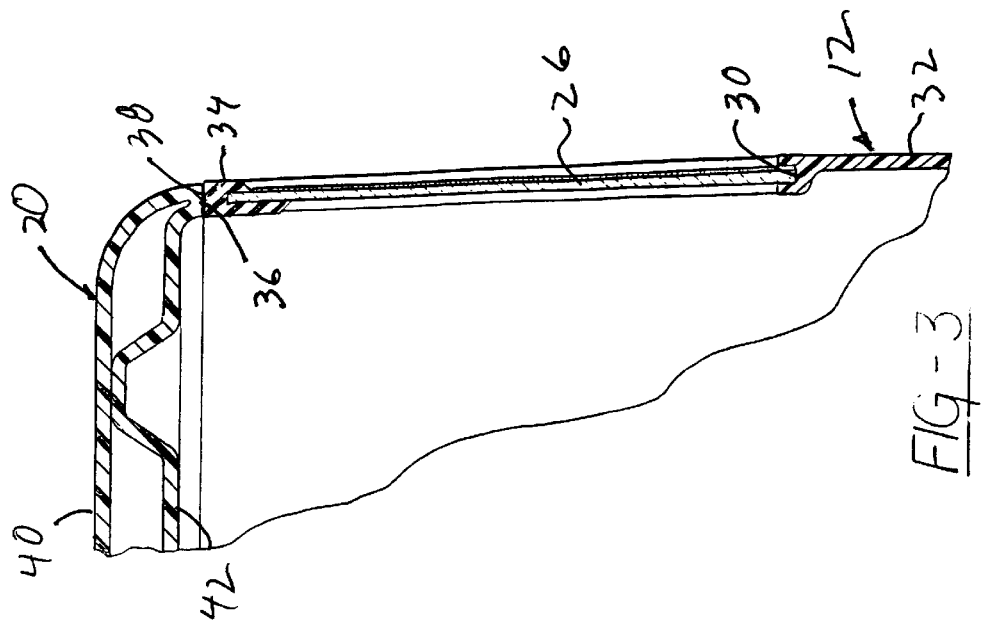
FIG. 3 is a view of the section 3—3 taken in FIG. 1.
Figure 2:
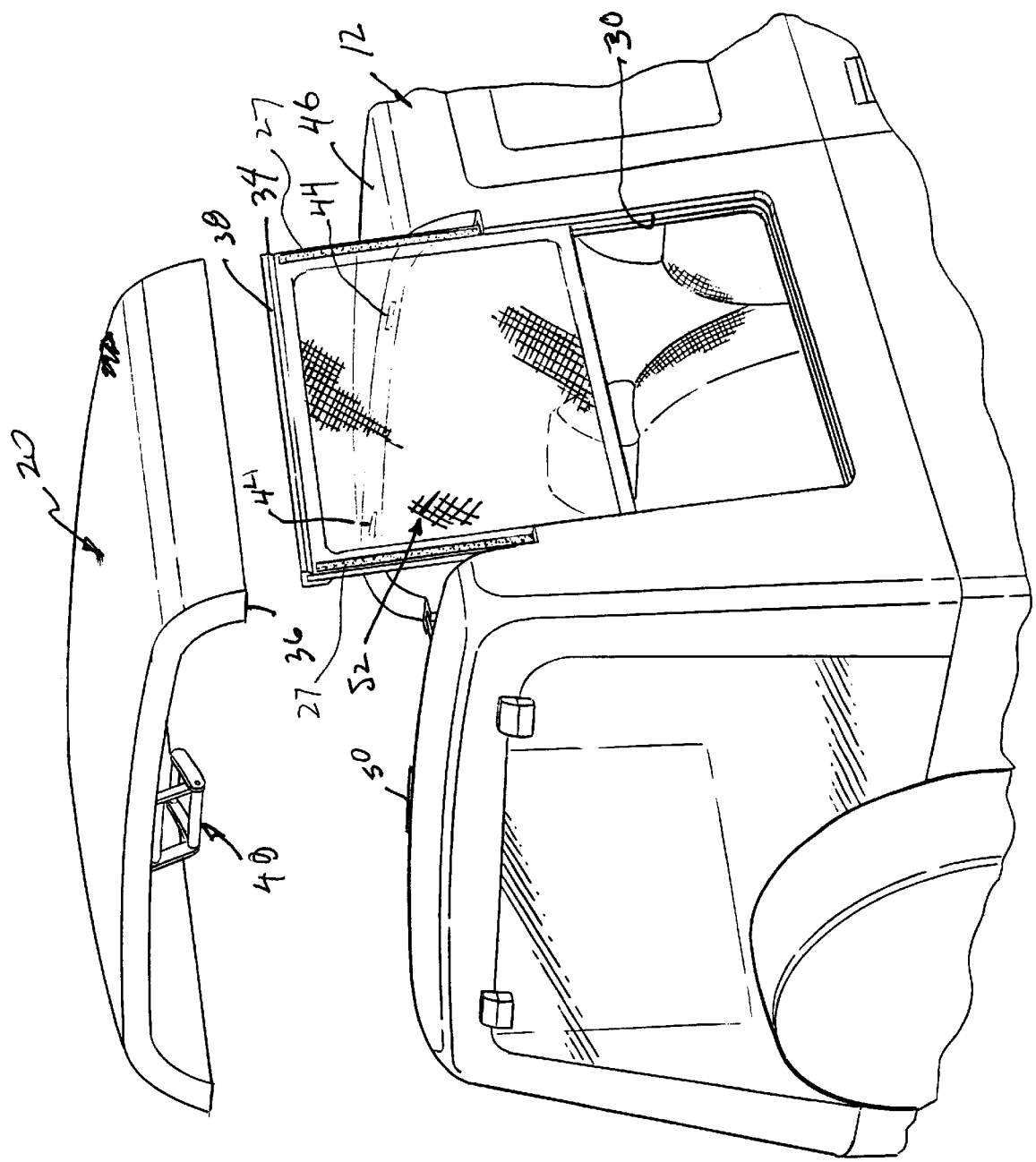
FIG. 2 is a fragmentary partially exploded perspective view of the vehicle shown in FIG. 1, showing the component parts of the closure panel mounting according to the present invention.

A track 30 is integrally formed in a side wall 32 of the hard top 12 extending about the U-shaped three sided opening 24 (FIGS. 2, 3).

In this embodiment, the closure panel 26 is slidable vertically downwardly into the three sided integral track 30. A grooved top piece 34 is affixed to the top edge of the closure panel 26. The roof panel 20 has a downward facing edge 36 which engages the upper surface 38 of the top piece 34 when the roof panel 20 is installed.

The roof panel 20 may have separate thermoformed sections 40, 42 molded together for added stiffness, although may also be molded as a single piece.

The roof panel 20 may be held with tabs (not shown) inserted in recesses 44 in the roof structure 46 adjacent the front edge of the panel 20, and an over center latch mechanism 48 and catch 50 at the rear edge of a type used with sun roofs and well known to those skilled in the art.

Figure 4:
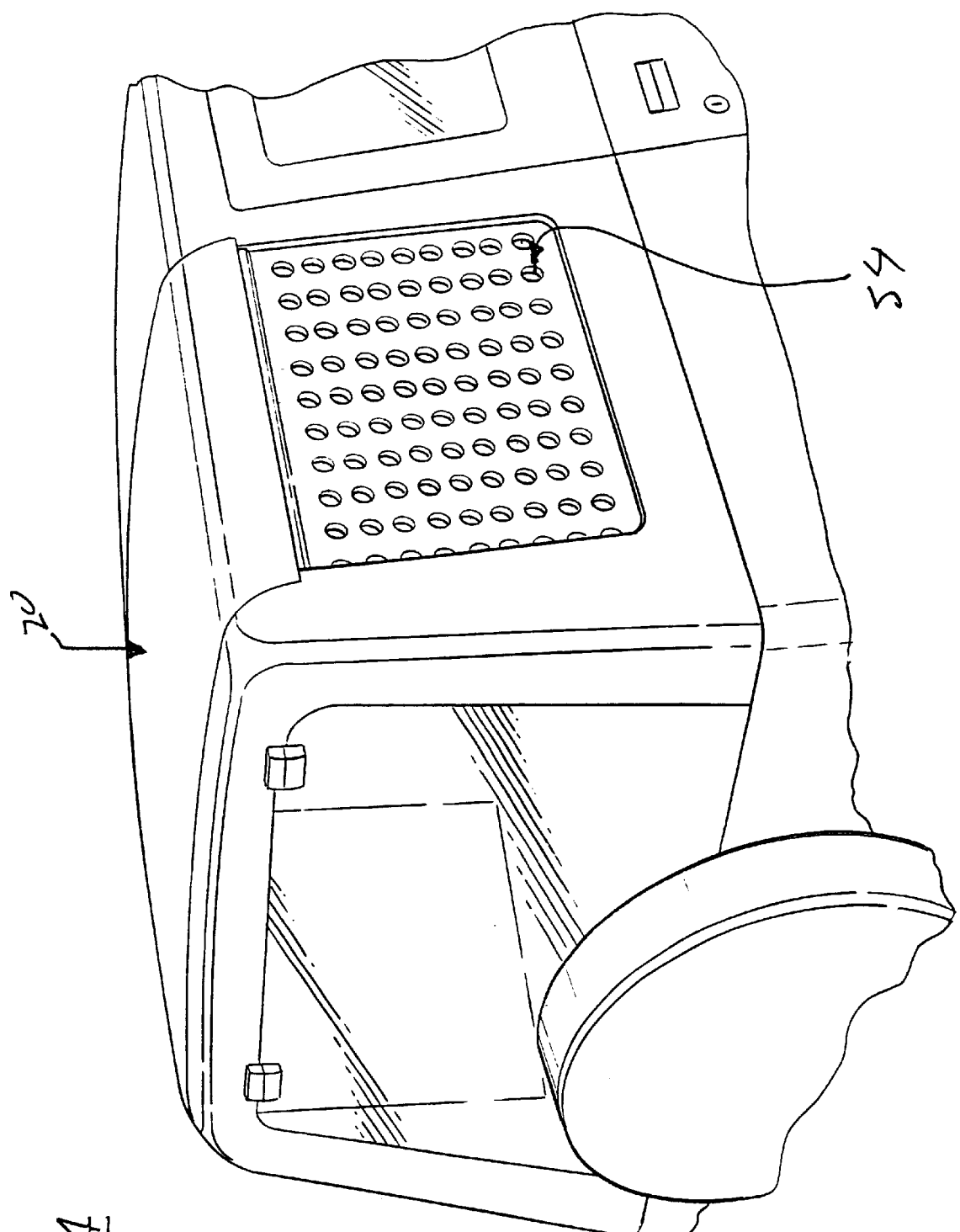
FIG. 4 is a perspective view of the vehicle shown in FIG. 1 with another closure panel substituted for the panel shown in FIG. 1.

The clear plastic panel 26 may thus be quickly and easily replaced with a framed screen panel 52 (FIG. 2), or a panel 54 providing a styling accent (FIG. 4), or various colored, textured, or graphic bearing panels. Alternatively, the panel 26 and roof panel 20 may simply be removed to provide a more open top structure, or to light the top for easier removal.

In order to reduce friction, provide a wind and rain seal, and reduce squeaking, strips 27 of Velcro® loop material can be bonded to each side of each version of the panel 26, as seen in FIG. 2 on the screened frame 52.

Figure 5:
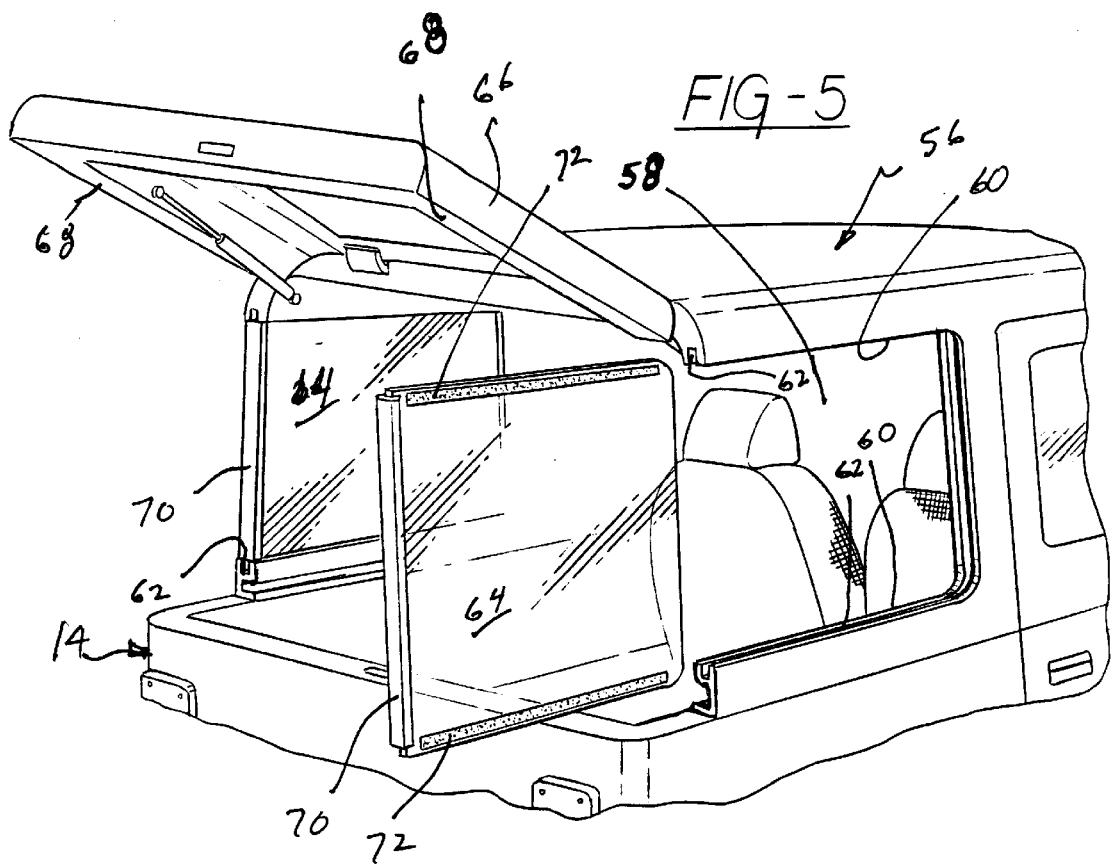
FIG. 5 is a fragmentary perspective view of a modified vehicle showing the components of an alternate embodiment of the closure panel mounting according to the invention.
Figure 6:
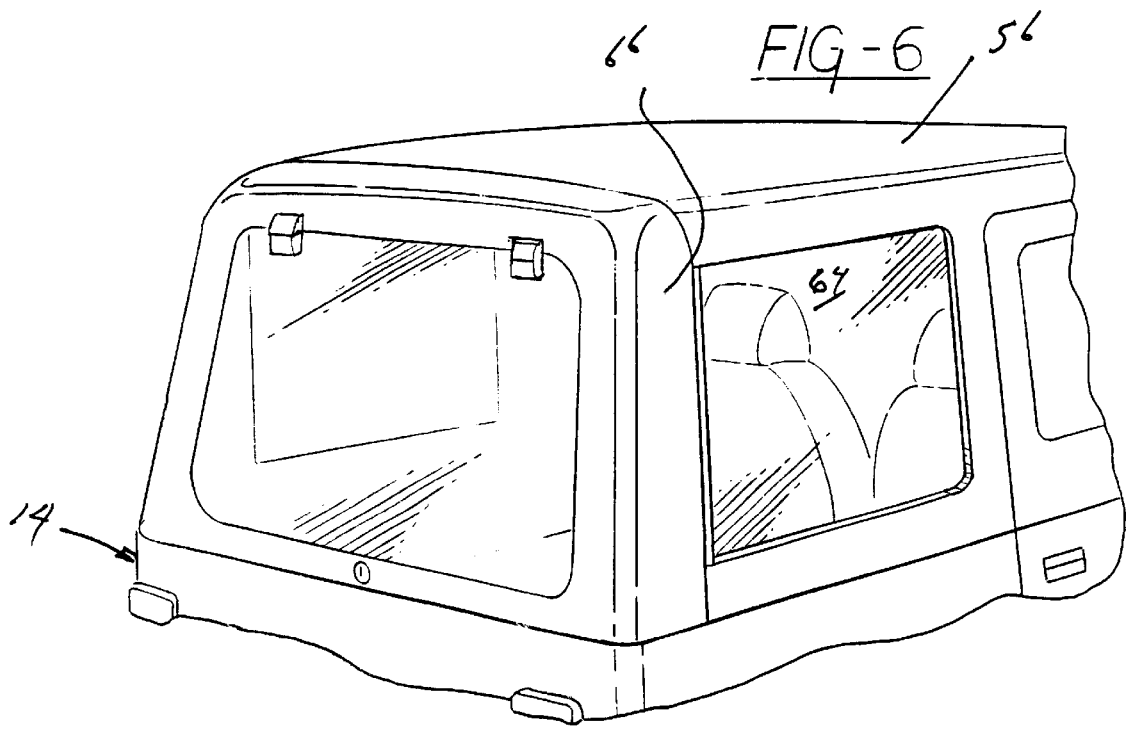
FIG. 6 is a fragmentary perspective view of the vehicle shown in FIG. 6 with a closure panel installed.

FIGS. 5 and 6 show an alternate embodiment in which hard top 56 is formed with a three sided opening 58 defined by horizontally extending opposite sides 60 each integrally formed with a track 62 configured to receive a closure panel 64 slid horizontally thereinto from the rear.

A hinged tailgate 66 is included in the hard top 56 having side edges 68 which each engage the rear of a respective edge piece 70 affixed to the rear side of the closure panel when the tailgate 66 is swung closed as seen in FIG. 6. This secures the closure panels 64 in the tracks 62. As before Velcro® loop strips 72 can be used on the top and bottom sides of each closure panel 64 to seal against wind, and reduce friction and squeaks.

Accordingly, it can be seen that a simple, convenient closure panel mounting is provided allowing removal or replacement of closure panels in a hard top for open top automotive vehicles, or for an integral top structure.

What is claimed is:

1. In combination with an automotive vehicle, a top structure with rectangular window openings therein, at least one of said window openings covered with a four sided removable closure panel, a mounting for said removable closure panel comprising a generally U-shaped, three sided recess having a track extending along said one opening adapted to slidably receive said closure panel from an open side of said track said track retaining three sides of said closure panel in said opening;

said generally U-shaped three sided recess having two opposite sides extending vertically so that said closure panel is slidable vertically down in being received therein;

said top structure including a removable top panel detachably attached thereto extending across said top structure;

said mounting further including an edge on said removable top panel compressibly engaging a fourth upper side of said closure panel disposed in said recess to secure the same therein.

2. The closure panel mounting according to claim 1 further including strips of material affixed to sides of said closure panel to be slidable thereon when installed in said three sided recess.

3. The closure panel mounting according to claim 1 wherein said fourth side of said closure panel has an elongated strip affixed thereto having a groove disposed to receive said edge of said top structure.

4. In combination with an automotive vehicle, a top structure with rectangular window openings therein, at least one of said window openings covered with a four sided removable closure panel, a mounting for said removable closure panel comprising a generally U-shaped, three sided recess having a track extending along said one opening adapted to slidably receive said closure panel from an open side of said track, said track retaining three sides of said closure panel in said opening;

said generally U-shaped three sided recess having two opposite sides extending horizontally to the rear of said top structure so that a closure panel is slid horizontally in a forward direction in being received therein;

said vehicle having a hinged tailgate at the rear of said vehicle, said mounting including an edge on said tail gate compressibly engaging said fourth rear side of said closure panel when said tail gate is closed to secure said closure panel in said recess.

5. The closure panel mounting according to claim 4 further including strips of material affixed to sides of said closure panel to be slidable thereon when installed in said three sided recess.

* * * * *